United States Patent [19]

Kracke et al.

[11] Patent Number: 4,559,743
[45] Date of Patent: Dec. 24, 1985

[54] METHOD FOR CALIBRATING A MACHINING SENSOR

[75] Inventors: Alan G. Kracke, Minnetonka; Douglas J. Hennenfent, New Hope; Allan L. Holmstrand, Bloomington, all of Minn.

[73] Assignee: Magnetic Peripherals, Inc., Minneapolis, Minn.

[21] Appl. No.: 665,865

[22] Filed: Oct. 29, 1984

Related U.S. Application Data

[63] Continuation of Ser. No. 430,194, Sep. 30, 1982, abandoned.

[51] Int. Cl.$^4$ ............................................. B24B 49/00
[52] U.S. Cl. ................................. 51/165 R; 51/281 R
[58] Field of Search ......................... 51/281 R, 165 R; 29/603

[56] References Cited

U.S. PATENT DOCUMENTS

| 3,787,638 | 1/1974 | Murai | 29/603 X |
| 3,821,815 | 6/1974 | Abbott et al. | 51/281 R |
| 4,155,106 | 5/1979 | Muraoka et al. | 51/281 R X |

Primary Examiner—James G. Smith
Attorney, Agent, or Firm—Edward L. Schwarz; Joseph A. Genovese

[57] ABSTRACT

A method of calibrating an analog machining sensor of the varying resistance type which has been deposited on a surface involves depositing adjacent it with great positional accuracy relative to a feature on the surface, discrete machining sensors. As machining takes place, the discrete sensor's continuities are successively broken as the analog sensor's height is reduced and its resistance increased. Measuring the resistance of the analog sensor at the time each discrete sensor breaks yields values from which the position of the analog sensor's machined edge can be very accurately related to the position of the feature on the surface.

5 Claims, 8 Drawing Figures

METHOD FOR CALIBRATING A MACHINING SENSOR

This is a continuation of Ser. No. 06/430,194 filed on Sept. 30, 1982 now abandoned.

BACKGROUND OF THE INVENTION

In certain manufacturing operations, particularly those for fabricating disc memory thin-film magnetic heads in situ on the air bearing slider to be carried by the head arm, it is desirable to machine the flying surface until a precisely located line on another surface intersecting the flying surface becomes the line of intersection of the two surfaces. In the thin-film head example, the head is carried on an end face of the slider which is approximately perpendicular to the flying surface, and the line is positioned to specify very accurately the thin-film head's throat height, that is the dimension of the flux gap normal to the transducing surface. (The transducing surface, of course, is nearly parallel during disc memory operation, to the medium surface.) Accuracy in throat height to within a few tens of microinches is desirable to insure optimum electronic and magnetic characteristics. Machining the flying surface until it coincides with the desired line of intersection then automatically sets throat height to the accuracy with which the line of intersection was set.

Controlling this dimension during fabrication has always been a difficult problem because of the extremely small dimensions and tolerances involved. Simply using the top of the slider prism as a reference surface for controlling throat height was satisfactory when grinding ferrite heads, see U.S. Pat. No. 3,982,318. But tolerance and dimensions are much larger in ferrite head technology.

Respecting thin film heads, recent innovations allowing accurate control of throat height involves the use of so called lapping guides or machining sensors, e.g., as disclosed in *IBM Technical Disclosure Bulletin (TDB)* Vol. 23, No. 6, November 1980, p. 2550. These guides or sensors are deposited conducting materials placed on the surface carrying the thin-film head. Two types of sensors are in general use. So-called discrete sensors simply have their electrical continuity broken at some point during machining and hence, provide an indication of machining progress at only a single instant. Analog sensors have an area of resistive material which is slowly removed by machining and hence provide a continuous indication until continuity is broken. With respect to discrete sensors, typically several at different heights are employed. The continuity of each is successively broken by the machining process, thereby providing a series of indications of precisely how much more machining must yet occur to reach the desired final position line. At the limits of or within the desired throat height range, a last sensor's conductive path will be opened signaling that the machining process should stop.

The use of these machining sensors drastically improves the accuracy with which the edge can be positioned relative to the feature. However, when dealing with thin-film magnetic heads, one cannot form conventional machining sensors with the same step which defines the throat of the gap. This is because the throat is formed by the deposition of an insulating layer, whereas the machining sensors are conductive patterns and hence are deposited in the steps creating the magnetic legs of the head. It is a known difficulty that successive layers of material deposited by the use of photo-optic masks and forming a composite thin-film structure cannot be registered with respect to each other with perfect accuracy. That is, the masks or patterns which define each of the features of successive layers such as the bottom leg, the throat and the top leg, cannot be placed in precise alignment with the patterns created by previous masking steps during typical manufacturing operations. Therefore, the throat height of a typical thin-film head cannot be controlled to an accuracy greater than the registraion between the throat insulation-forming pattern and the magnetic leg/machining sensor-forming pattern. Experience shows that this inherent inaccuracy results in a substantial percentage of head gaps which have throat heights outside of the required tolerances. Worse still, even though the throat height-defining step occurs intermediately in the process, one cannot easily tell whether or not the head is good until the manufacturing process is complete, making the relatively high number of reject heads an expensive flaw in these previous systems.

The problem of aligning machining sensors with a feature formed of insulating material such as the throat defining layer of a thin-film head is present for both discrete and analog sensors. In a current manufacturing process, analog sensors are used to indicate the progress of machining of a workpiece carrying several thin-film heads. The machining step sets the throat heights for all the thin film heads simultaneously. An analog sensor is interposed between each pair of heads. It is necessary that the position of each analog sensor vis-a-vis its adjacent heads be known very accurately so that machining can be halted when the throat heights of as many heads as possible are within the desired tolerances. (Due to various inaccuracies in the process, it is possible that not all throat heights can be reduced to a value within the tolerance range at the same time.) Such a process is described in U.S. Patent Application Ser. No. 06/430,193, entitled Workpiece Carrier, and having the same co-inventors, filing date and assignee as this application.

*IBM TDB* Vol. 18, No. 1, June 1975, p. 227, recognizes the difficulty in aligning features of different deposition layers and apparently teaches depositing the lapping control layer with the same step which forms the "registration of the insulating layer forming the gap or covering the gap layer." How an insulating layer can be registered in the same step with depositing the lapping control layer isn't explained.

*IBM TDB* Vol. 23, No. 2, July 1980, p. 776, teaches a method of calibrating an analog lapping guide or machining sensor to compensate for variations in bulk resistivity and film thickness. This method is not involved with determining position of the analog sensor relative to a feature of an insulating layer.

BRIEF DESCRIPTION OF THE INVENTION

The solution we propose to the problem is to create the machining sensor or indicator with the same deposition mask that defines the insulating feature to be precisely located relative to the final position of the lapped edge. The way we accomplish this is by providing a first conductive layer on the face which is to carry the feature, which extends from near the original position of the edge to to be machined through the allowable tolerance band which the final position of the edge may occupy. This can, in the case of thin-film magnetic heads, be conveniently included in the deposition step forming the bottom leg of the thin-film head. During the step which creates the feature from which the final position of the machined edge is specified, an additional barrier area of insulating material is deposited on the first conductive layer and lying along a so-called sensing line substantially parallel to the edge which the machining will create, using the same mask to create both. The sensing line defining the one edge of the barrier area is precisely positioned relative to the feature because both are created with the same mask in the same deposition step.

Then a second conductive layer is deposited on the barrier area contacting the first conductive layer directly only between the initial location of the edge and the sensing line. In the manufacture of thin-film heads, this step will typically occur in conjunction with the depositing of the top leg of the magnetic flux path. Those skilled in the art understand that each of these three layers are produced by a series of steps including the use of a precision mask, usually optical, to form the desired pattern in the layer with very high precision.

The edge of the surface is then machined from its initial location toward the sensing barrier line edge. When the machined edge reaches the sensing line, electrical continuity between the first and second conductive layers is broken (assuming a non-conductive machine tool). A continuity tester connected between the second conductive layer lying on the barrier area and the first conductive layer will indicate an open circuit indicating position of the machined edge. If the sensing line is intended to define the ideal final position of the line of intersection of the two surfaces, then machining is halted.

In fact, the preferred application for this discrete machining sensor is to calibrate a conventional analog sensor to precisely determine its position relative to a feature line precisely defining the edge of an insulating feature. This is accomplished by using one or more discrete sensors, each having a different sensing line intersecting the sensing area of the analog sensor, and each precisely positioned relative to the feature line. At each point in the machining operation where a discrete sensor opens, the resistance of the analog sensor is measured. These resistance values may be substituted in a general equation of the form h=K/R relating analog sensor resistance R with spacing h of the top edge of the analog sensor from the machined edge. The equation can then be solved to provide a value for the constant K and any other constants to yield an equation directly relating sensor resistance with machined edge spacing from the feature position line.

Accordingly, one purpose of this invention is to increase the accuracy which machining of the edge of a surface can place the edge relative to a feature carried on the surface.

A second purpose is to reduce the scrap rate during such machining operations.

Another purpose is to combine the steps of forming the throat filler material of a thin-film head with the step forming the machining guide when machining a transducer assembly carrying a thin film-head.

Yet another purpose is to allow more accurate measurement of the current status of the machining operation.

Other objects and benefits of this invention will be evident from the following explanation.

DESCRIPTION OF THE PREFERRED EMBODIMENTS

Since this discrete sensor has been developed specifically for the purpose of controlling throat height of a thin-film head, the description is based on an application in this area. It has identical applicability in any case where such machining relative to a feature defined by deposited insulating material must be controlled.

Figure 1:
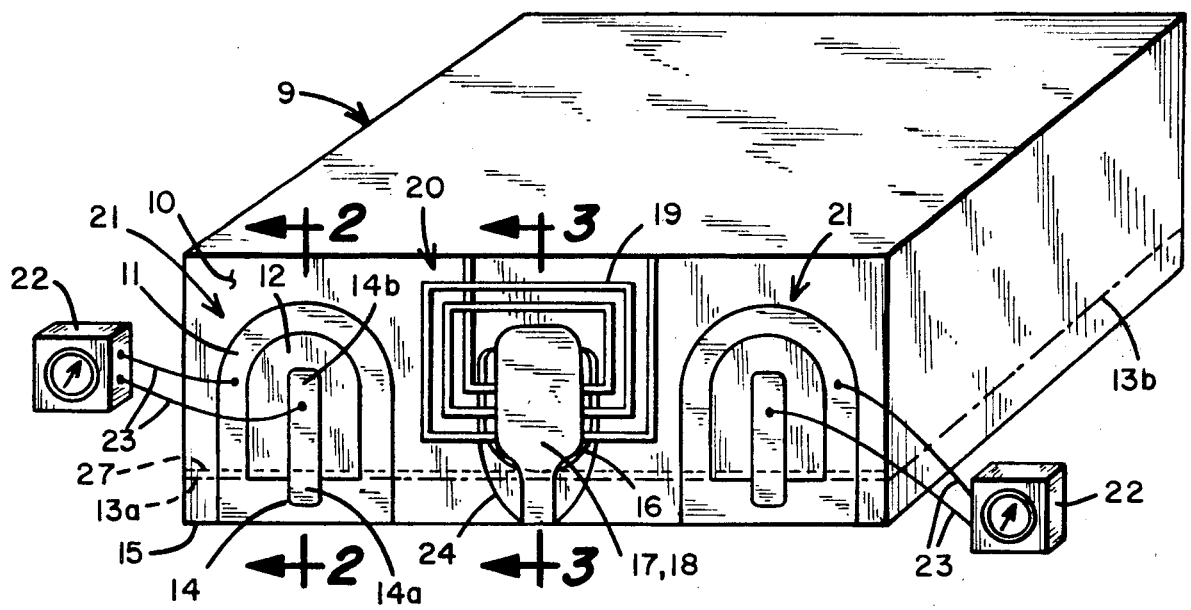
FIG. 1 is a perspective view of a prism having a surface on which the subject inventive article is located, and showing an intermediate step in the inventive method.

FIG. 1 shows a greatly magnified perspective view of a machinable prism or block 9 formed of a ceramic material, and comprising a thin-film head air-bearing slider as it looks just before the final machining of the air-bearing face. Line 15 is the initial position of the edge of end face 10, defined by the intersection of the initial position of flying surface 26 (shown on edge in FIGS. 2 and 4) with face 10. Surface 26 is to be machined until its intersection line with end face 10 reaches its ideal position coinciding with a sensing plane 13 defined by the two lines 13a and 13b.

Figure 2:
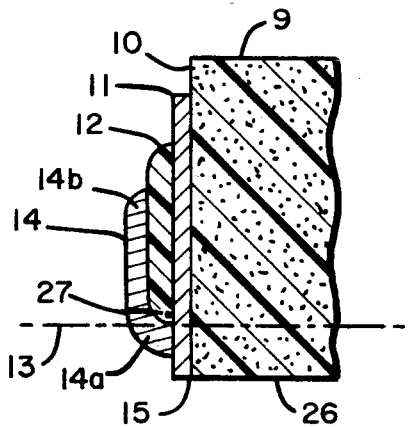
FIGS. 2 and 4 are cross sections through one of the machining sensors shown in FIG. 1 before and after the machining step, respectively.

On end face 10 there has been placed a machining sensor or guide 21 including a conductive layer or area 11 intersected by sensing line 13a or plane 13, and having any convenient shape. FIG. 2 shows this guide 21 in cross section prior to final machining. On top of conductive area 11 an insulating layer comprising barrier area 12 is deposited, having one edge lying along the sensing plane 13, extending away from the initial location of line 15 at the edge of face 10 and lying atop conductive layer 11. Sensing plane 13 should be substantially parallel to the initial location of line 15 at the edge of face 10. A preliminary machining step may be necessary to configure prism 9 so that this relationship exists. Another deposited conductive layer forming conductive area 14 is located entirely within barrier area 12 on the side of the sensing line 13a and extends across line 13a, contacting conducting surface 11 between the sensing line 13a and the initial location of the edge at line 15. Thus, conductive layer 14 is completely insulated from conductive layer 11 as to layer area 14b, i.e., the portion above line 13a, and makes electrical contact with layer 11 in area 14a, below line 13a.

Figure 3:
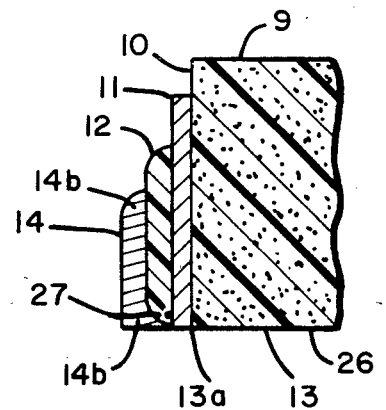
FIGS. 3 and 5 are cross sectional views of the feature relative to which the edge positioned by the machining is respectively located before and after machining.

For illustrative purposes here, a simplified diagram of a typical thin-film head 20 is shown adjacent machining guide 21 and in cross section in FIG. 3 before machining. This comprises a pair of magnetic flux paths 17 and 18 (see FIGS. 3 and 5), a winding 19, and a deposited insulating material 24 typically formed of aluminum oxide interposed between leg 17 and leg 18 of the magnetic flux path, thereby creating the flux gap 25. A second insulating layer 16 insulates turns 19 and defines the interior end of flux gap 25. This interior end of flux gap 25 lies along one segment of a feature line 27, shown on end as dots in FIGS. 2-5. The spacing between feature line 27 and sensing line 13a is formed by the same deposition step and with the same mask, and is therefore known with great precision, since no mask alignment errors are present.

To provide a flux gap 25 of the proper throat height, it is necessary to machine face 26 until it coincides with plane 13 on face 10 within a tolerance of 60 uin. Flux gap 25 is physically formed by and essentially comprises deposited non-magnetic insulating material. It will be clear to one skilled in the art that by creating the edge of barrier area 12 along sensing line 13a, which defines the point at which machining is to stop, with the same mask and in the same deposition step defining the interior end of gap 25 along feature line 27, gap 25 throat height will be very accurately defined and much more accurately so defined than if the feature line 27 and sensing line 13a were created during separate deposition steps or with different masks. It will also be clear that control of throat height of a thin-film head gap is only one of many possible applications where this procedure may be used.

The machining is conventional, and can be performed by lapping or other high precision operation, but must be performed by a tool which does not short between layers 11 and 14. Continuity testers 22 are connected to conductive surface 11 and conductive layer 14b by connectors 23.

Figure 4:
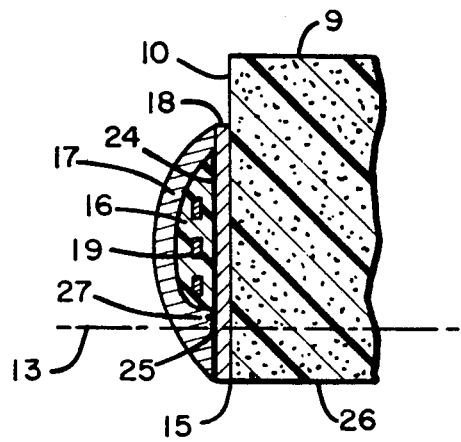
Figure 5:
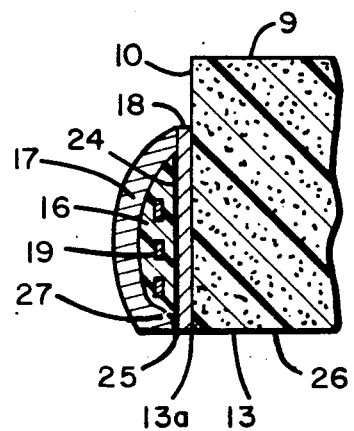

The machining slowly erodes the material between plane 13 and the initial location of the edge of face 10, line 15. When the material between plane 13 and line 15 has been completely eroded, electrical contact between layers 14a and 11 is broken and continuity testers 22 indicate this condition. The final configuration of a machining sensor 21 is shown in FIG. 4. The operator monitors testers 22 and can see the indication by them and stop the machining. Alternatively, the machining device can be connected to testers 22 to automatically stop its operation once continuity fails.

The reason the initial position of line 15 must be nearly parallel to sensing plane 13 is now apparent. When the edge of face 10 is machined to coincide with plane 13, if they are not parallel at that time, some material past plane 13 will be removed, causing one corner of the sensor 21 to define the end of continuity and the sensors 21 will lose continuity at different times. Thus, at some point in the machining operation, edge 15 should be approximately parallel with sensing plane 13. The position of the edge of face 10 at that point can be considered its initial position. Machining to achieve this relationship may be considered merely a preliminary step. The effect of such non-parallelism can be reduced by making layer 14 more narrow and by placing sensors 21 close together. However, the likelihood of a defect in the electrical contact between layers 14 and 11 which totally destroys initial continuity is then greater. The inherent width of the feature and its appurtenant structure (head 20) limits the proximity between sensors 21.

While the sensors 21 and the associated process just described function satisfactorily for certain requirements in small production runs, the commercial requirement for many thousands of magnetic heads 20 has led to a preferred use for these sensors 21. To cheaply and efficiently manufacture these heads 20, we prefer to place several on a single bar, and then machine all of their flying surfaces 26 simultaneously.

In the U.S. Patent Application Ser. No. 06/430,193, entitled "Workpiece Carrier", and mentioned earlier, our preferred use for this invention is described in some detail. Briefly, this application describes a workpiece support capable of bending the bars on which the heads are placed, so as to place a greater number of the throat heights of the heads on the bar within the tolerance range required. To determine current status of each head's throat height, frequent measurements of each of these throat heights occur during the final machining phase. Accurately calibrated analog machining sensors are located adjacent each head on the bar. If indications from these sensors early in the final machining operation reveal that certain throat heights will be out of tolerance when machining has placed all others within the desired tolerance, then the bar is bent to cause additional machining of the flying surfaces of certain heads to occur relative to the machining of other heads' surfaces. By properly choosing the amount and location of this bending, a much greater percentage of the heads' throat heights can be caused to fall within the tolerance range at the completion of machining. But of course, the sensors providing this information must accurately measure throat height at frequent intervals. Because such analog sensors have constituent elements formed by conductive deposits, they suffer from the alignment errors which also plague conventional discrete sensors.

Figure 6:
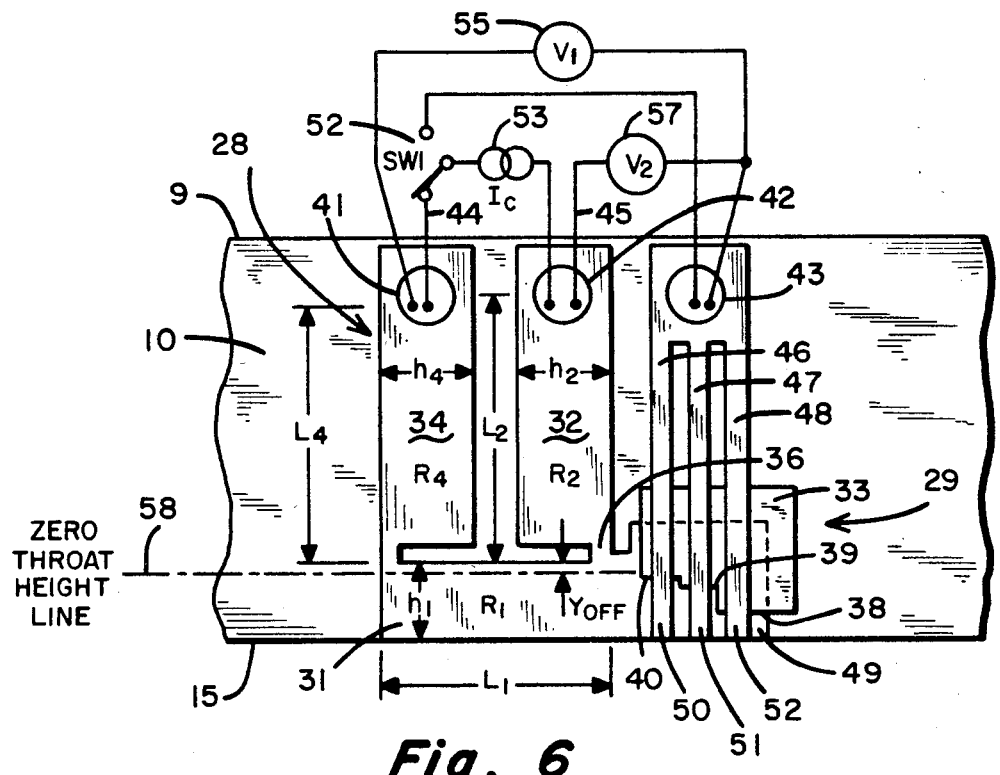
FIG. 6 discloses a structure incorporating this discrete sensor in a preferred composite sensor to be employed in mass production of devices such as thin-film heads, which have close tolerance dimensions based on the position of an edge of an insulating area.

A composite machining sensor which includes an analog sensor 28 continuously providing a signal specifying the position of the machined edge 15 is shown in FIG. 6. The zero throat height or feature line 58 essentially defines the position of the feature relative to which line or edge 15 is to be positioned by machining. The composite sensor is mounted on end face 10 of prism 9 and includes a parallel-edged analog sensing element 31 formed of a resistive conducting strip and three discrete sensors formed from conductor paths 46-48, insulating barrier area 33 beneath them, and a conductive area 49 below the barrier area 33 making electrical contact with ends 50-52 respectively of conductor paths 46-48. Sensing line segments 38-40 form a staircase pattern along the bottom edge of barrier area 33 and are offset with respect to each other, are approximately parallel to edge 15 as initially positioned, and have extensions which are a predetermined distance from each other. Each of the sensing line segments 38-40 are located at a precisely known spacing from the zero throat height or feature line 58 by virtue of their creation by the same process step and with the same mask as that which produced the interior end of the flux gap of the appurtenant head or other device. Conductor paths 46-48 have appreciable electrical resistance and are commonly connected to connector pad or terminal 43. Paths 46-48 cross line segments 40-38 respectively and all make electrical contact with conductive area 49. Terminal 43 in turn is connected to the upper selectable terminal of single pole double throw (SPDT) switch 52, and to one terminal each of voltmeters 55 and 57.

Analog sensing element 31 is unitary with the conductive area 49 with forms part of the discrete sensors 29. The ends of sensing element 31 are connected by bridges 35 and 36 to resistive conductor paths 34 and 32 respectively. Element 31 has an appreciable amount of resistance, initially $R_1$, between bridges 35 and 36. The nominal height $h_1$ and length $L_1$ determine its resistance in large part, during machining. As the bottom edge 15 of end surface as face 10 is slowly machined away, the height $h_1$ of element 31 decreases and, naturally, its resistance increases.

Paths 34 and 32 connect conductive bridges 35 and 36 to connector pads or terminals 41 and 42 respectively. Conductor paths 34 and 32 themselves have in one preferred embodiment appreciable resistance, again dependent on their lengths $L_4$ and $L_2$ and heights $h_4$ and $h_2$, respectively. Resistance in conductive paths 34 and 32 is unavoidable because they too are unitary with analog sensing element 31, which must have some resistance within it to properly perform its sensing function. Connector pad 41 is connected to the terminal of voltmeter 55 not connected to pad 43 such that voltmeter 55 measures voltage between pads 41 and 43. (Voltmeters 55 and 57, switch 52 and constant current source 53 are located remote from face 10.) Pad 41 is also connected to the lower selectable terminal of SPDT switch 52. Pad 42 is connected to one terminal of constant current source 53 and to the terminals of voltmeter 55 and voltmeter 57 not connected to pad 43. The terminal of constant current source 53 not connected to pad 42 is connected to the center or common terminal of SPDT switch 52.

We have developed an equation of the form $h = K/R$ which relates the value of sensor 31 height $h_1 = h$ to the dimensions of conductors 34 and 32 as incorporated in the constant K, and to voltages measured by voltmeters 55 and 57 which provide a current indication of the analog sensor 31 resistance R. As is derived in the Appendix, sensor height $h_1 = V_2 h_2 / Q (V_1 - xV_2)$, $V_1$ and $V_2$ measured with switch 52 in the down position shown. It is thus obvious that throat height $= V_2 h_2 / Q (V_1 - xV_2) - Y_{off} = h_1 - Y_{off}$, where $Y_{off}$ is the spacing between the top of analog sensing element 31 and the zero throat height or feature line 58 defining an edge of the feature relative to which discrete sensor 29 is deposited. In these equations, $Q = L_2 / L_1$ and $x = L_4 / L_2$. It is relatively easy to control the deposition such that paths 34 and 32 have nearly identical dimensions so that $L_4 = L_2$ and $x = 1$ to within $\pm 2\%$ or less, and we prefer in one embodiment to do this. Even larger ($\pm 4\%$) errors affect throat height measurements by only a microinch or so.

It is also possible to deposit path 34 with a very small effective $L_4$ ($L_4 << L_2$) by forming path 34 with height and thickness substantially greater than for path 32. By properly specifying the dimensions of path 34 formed by the deposition process, x can be set to fall in the range of 0.01 to 0.1. Although the precision with which x is known in this case may be no better than $\pm 10\%$ or even $\pm 20\%$, since the value of x is quite small, the overall impact on throat height measurement accuracy is similar to the case where $x = 1$ and is known to $\pm 2\%$. Once the deposition process is stabilized, an average value of x can be determined by either calculations or direct measurements of the resistance of paths 34 and 32 on representative prism faces 10, allowing x to be treated as a constat thereafter.

There are therefore in either embodiment, two unknowns in the throat height equation, $h_2/Q$ and $Y_{off}$. With $V_1$, $V_2$, and x known, it is possible to determine the values for $h_2/Q$ and $Y_{off}$ by measuring the values for $V_1$ and $V_2$ at known throat heights. This is accomplished by reference to discrete sensors 29. As machining of prism 9 begins, line 15 moves slowly toward line 38, increasing resistance of and voltage across line 38, increasing resistance of and voltage across analog sensor element 31. At some point, line 15 coincides with line 38 causing the sensor comprising conductor path 48 to open. If switch 52 is in its up position near to that time, the voltage $V_1$ measured by voltmeter 55 will undergo a sudden increase when continuity ends since the resistance between conductive area 49 and pad 43 has increased, while current flow $I_c$ from constant current source 53 has remained unchanged. (Since voltmeter 55 is assumed to have very large resistance compared to the resistance in path 34 and element 31, $V_1/I_c$ very precisely states the resistance between area 49 and terminal 43.) At this time, throat height is known with great precision as the preselected exact spacing between line segment 38 and zero throat height line 58.

As soon as the increase is $V_1$ is detected, switch 52 must be moved to its down position, allowing the value of $V_1$ to be read for use in the equation expressing throat height. $V_2$ is also read at this time for use in the equation. Although dimensions of the deposited resistors can not be precisely set by the deposition process, $L_1$ and $L_2$ as well as $h_2$ and $Y_{off}$ are known with reasonable initial accuracy, having been formed by the same mask. At the time that line 15 coincides with line 38, throat height is known with great precision. Substituting the approximations for Q ($= L_2/L_1$) and $h_2$, the measured values for $V_1$, $V_2$, and the exact throat height into the equation for throat height above, yields a better approximation for $Y_{off}$, increasing the precision of its value substantially.

With switch 52 again in the up position, machining continues until line 15 coincides with line 39, causing the discrete switch comprising path 47 to open and another jump in the value of $V_1$ to occur. Again, a second precise value for throat height is available. At this point, with two values for throat height known with great accuracy and with two values each for $V_1$ and $V_2$ for those throat height values also accurately known, it is possible to solve two throat height equations simultaneously for the value of $h_2/Q$ and $Y_{off}$. After this point, throat height will be known with great accuracy by simply measuring the values of the $V_1$ and $V_2$ and calculating it using the just-determined values for $h_2/Q$ and $Y_{off}$. Thus, voltmeters 55 and 57 function as an ohmmeter in conjunction with the foregoing equation for throat height, to determine resistance $R_1$ after calibration.

For the particular application for which we have developed this method, it is necessary that each composite sensor be particularly effective in indicating when throat heights range from 20 to 80 uin. With that tolerance band, we have found it convenient to place a first sensing line 38 of barrier area 33 at 200 uin. from the zero throat height line 58, a second sensing line 39 at 80 uin. from line 58, and sensing line 40 at 20 uin. from line 58. Recall that these discrete sensors can be placed at accurately known distances from zero throat height line 58. Thus, during machining when the individual sensor formed by line 39 and conductor 47 is severed, then the operator knows that the upper limit for throat height has been reached by the adjacent heads. When the sensor comprising sensing line 40 and path 46 opens, then the operator knows that the adjacent head has fallen out of tolerance and must be discarded. The ideal final position line to which line 15 is machined, may be anywhere within the throat height range of 20–80 uin.

The relatively good accuracy with which $L_1$, $L_2$, and $h_2$ are initially known being all defined by the same mask, in contrast to the lower initial accuracy with which $Y_{off}$ is known, and the great accuracy with which throat height is known when the sensor comprising conductor 48 and barrier line 38 opens in combination allow one to determine $Y_{off}$ with substantially increased accuracy. In our method, $Y_{off}$ is initially known to ±50 uin. whereas the value of $h_2/Q$ has an inherent inaccuracy of only about ±10 uin. When machining has proceeded such that line 15 coincides with line 39 and the discrete sensor comprising path 47 loses electrical continuity, then a better value for $h_2/Q$ and $Y_{off}$ can be calculated by solving for $h_2/Q$ and $Y_{off}$ simultaneously using the two values for throat height previously measured. This yields a somewhat greater accuracy of around ±5 uin. for the final computations of throat height calculated by the throat height equation as machining of prism 9 along line 15 occurs.

Accordingly, if a large number of these composite elements are simultaneously employed during machining on a prism 9 carrying many thin-film heads, it is possible to stop machining at a time which permits the maximum number of heads adjacent to the sensors to have the correct throat height. Alternatively, if one wishes to employ the aforementioned invention permitting prism 9 to be bent during the machining process, one can sense what direction of bending is necessary to result in the greatest possible yield of good heads.

APPENDIX

Figure 7A:
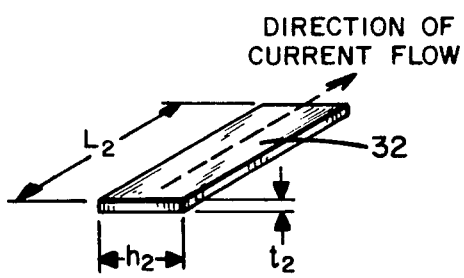
FIG. 7a is a magnified perspective view of an individual thin-film resistor of FIG. 6.

Referring first to FIG. 7a, the stylized thin-film resistor 32 is shown to have length, height, and thickness dimensions respectively of $L_2$, $h_2$, and $t_2$. Current flow is parallel to the length dimension.

Figure 7B:
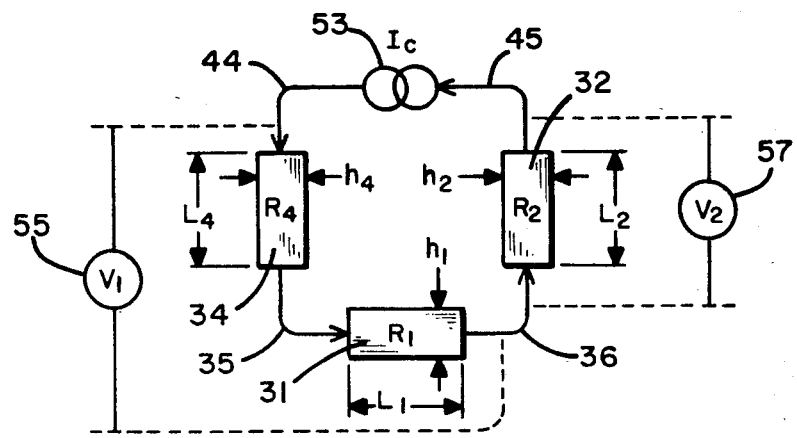
FIG. 7b is a circuit schematic of the analog sensor network of FIG. 6.

The schematic diagram of FIG. 7b reflects the electrical circuit on surface 10 in FIG. 6 and is amenable to mathematical analysis as follows using the symbols:

R = resistance
P = resistivity of film
t = film thickness
h = resistor height
L = resistor length
A = cross sectional area of resistor The conductor paths or areas of FIG. 6 will hereafter in this analysis be referred to as resistors, but the use of reference numerals will be consistent from FIG. 6 to FIGS. 7a and 7b.

We can write the following equations governing the resistance of each resistor:

$$R_4 = PL_4/th_4 = CL_4/h_2$$
$$R_2 = PL_2/th_2 = CL_2/h_2$$
$$R_1 = PL_1/th_1 = CL_1/h_1$$

(Assuming P and t are uniform across the entire surface of prism 9 and that $h_2 = h_4$ allows C to be substituted for P/t. These are reasonable assumptions.)

We next solve for $h_1$ in terms of resistance and resistor size:

$$R_1 + R_4 = C8\ (L_4/h_2) + (L_1/h_1)]$$

Substituting the value of $C = R_2 h_2/L_2$ into this equation yields $$R_1 + R_4 = (R_2 h_2/L_2)(L_4/h_2) + (R_2 h_2/L_2)(L_1/h_1)$$

which can be rewritten as $$h_1 L_2 (R_1 + R_4) - h_1 L_4 R_2 = R_2 h_2 L_1.$$

Thus, $$h_1 = R_2 h_2 L_1 / [L_2(R_1 + R_4) - L_4 R_2[ \quad (1)$$

Since $I_c$ is by definition constant, then $R_1 + R_4 = V_1/I_c$ and $R_2 = V_2/I_c$ where $V_1$ is the voltage drop across both resistors 31 and 34, as measured by voltmeter 55 and $V_2$ is the voltage across resistor 32 measured by voltmeter 57. Both measurements occur with switch 52 in its "down" position. Voltmeters 55 and 57 both have internal resistances very large compared to that in the series path of area 49, paths 46–48, and pad 43 (FIG. 6). Thus voltage across this series path is negligible when measuring voltages between pad 43 and pad 41 or 42. Paths 46–48 serve double duty in a sense, functioning as elements of discrete sensors 29 and also as connector paths between voltmeters 55 and 57 and the junction between resistors 31 and 32. Once machining reaches line segment 40, voltages $V_1$ and $V_2$ can no longer be measured since the voltage adjacent bridge 36 is unavailable. Note that the entire sensor 29 will typically be only a few thousandths of an inch wide.

Substituting these values for $R_1$ and $R_2$ into equation (1) yields $$h_1 = (V_2/I_c)(h_2 L_1)/[(V_1/I_c)L_2 - (V_2/I_c)L_4]\text{ or}$$
$$h_1 = V_2 h_2 L_1/(V_1 L_2 - V_2 L_4) \quad (2)$$

If we set $x = L_4/L_2$ and $Q = L_2/L_1$ so that $L_4 = xL_2$ and $L_2 = QL_1$, then $L_4 = xQL_1$. Substituting these values of $L_2$ and $L_4$ into equation (2) above yields $$h_1 = V_2 h_2/Q(V_1 - xV_2). \quad (3)$$

In FIG. 6, by definition $h_1 = Y_{off} +$ throat height, where $h_1$ is the current height of sensing element 31. Substituting the value of $h_1$ from equation (3) into this equation above yields $$\text{throat height} = [V_2 h_2/Q(V_1 - xV_2)] - Y_{off}.$$

What is claimed is:

1. A method for controlling the machining of a first edge of a surface on a workpiece from its initial location to adjacent an ideal final position line substantially parallel to the first edge and carried on the surface, and having a predetermined precise spacing from a feature line carried on the surface and substantially parallel to the first edge, comprising the steps of:
   (a) forming at least one discrete machining sensor each having a sensing line falling between the initial location of the first edge and the ideal final position line, said sensing line being substantially parallel to the first edge, and having a precisely determined spacing from the feature line;
   (b) forming a parallel-edged resistive conducting strip comprising resistive material of substantially constant thickness lying along the first edge's initial location and intersected by:
      (1) extensions of each of the sensing lines, and
      (2) the ideal final position lines, said resistive conducting strip having a less precise spacing from the feature line than has the sensing line of the discrete sensor;
   (c) connecting a resistance measuring means across the resistive conducting strip, which means provide a signal indicative of the resistance of the conducting strip;

(d) connecting a continuity tester across each discrete sensor;

(e) machining the first edge of the surface toward the feature line until the continuity tester indicates that continuity of a discrete sensor has ceased; then without further machining (f) analyzing the signal from the resistance measuring means to determine the resistance R across the resistive conducting strip;

(g) calculating a constant of inverse proportionally K from an equation one of the form $h=K/R$ by substituting (1) the known spacing from the feature line of the sensing line whose discrete sensor's continuity has ceased, for the distance h between the feature line and the first edge, and (2) the resistance indicated by the resistance measuring means for the resistance R across the resistive conducting strip, and solving the equation for K;

(h) continuing machining of the first edge toward the ideal final position line;

(i) while machining, analyzing periodically the signal from the resistance measuring means to determine the resistance R of the resistive conducting strip, and with the previously calculated value of K, calculating therefrom the current value of h using equation one; and (j) ceasing machining when the value of h is reduced to within a predetermined range of the predetermined precise spacing between the ideal final position and feature lines.

2. The method of claim 1, wherein the resistive conducting strip forming step further comprises forming of the same resistive material on the surface first and second connector paths of similar thickness and width, and having a preselected known effective length ratio x, and each connected at an end to one end of the resistive conducting strip, and forming a third connector path connected to the junction between the second connector path and the resistive conducting strip; and forming the edge of the resistive conducting strip which is remote from the first edge a distance approximately $Y_{off}$ from the feature line; wherein the resistance measuring means connecting step includes connecting a constant current source to pass current through the first connector path, the resistive conducting strip and the second connector path in series, and connecting a voltmeter to measure voltages $V_1$ and $V_2$ respectively between the first and third, and second and third connector path's ends unconnected to the resistive conducting strip; and wherein the discrete machining sensor forming step further comprises forming at least first and second of said sensors each having a sensing line having a unique predetermined precise spacing from the feature line; and further comprising the steps of:

(a) machining the first edge of the surface toward the ideal final position line until the continuity tester indicates that continuity of the first and second discrete machining sensors has ceased;

(b) recording the voltages $V_1$ and $V_2$ at each instant continuity for a discrete sensor ceases;

(c) inserting the known values of the predetermined precise spacing between the sensing lines and the feature line as the variable h, and the corresponding values for $V_1$ and $V_2$ recorded when the associated first and second sensors' continuity ceased, into the equation two $h=[V_2h_2/Q(V_1-xV_2)]-Y_{off}$ to produce two linear equations in the two unknowns $h_2/Q$ and $Y_{off}$;

(d) solving the two linear equations simultaneously for the values of $h_2/Q$ and $Y_{off}$ and inserting these values into the equation two specifying h; and (e) while machining continues, periodically recording the voltages $V_1$ and $V_2$ and calculating h from equation two using the values for $V_1$ and $V_2$ most recently recorded and the values for $h_2/Q$ and $Y_{off}$ resulting from solving the two linear equations.

3. The method of claim 2, wherein the first and second conductor path forming step further includes the step of forming said paths with nearly identical dimensions; and further including the step of setting $x=1$ in the steps involving equation two.

4. The method of claim 1, wherein the resistive conducting strip forming step further comprises forming of the same resistive material on the surface first and second conductor paths of similar thickness and width, and having a preselected known effective length ratio x, and each connected at an end to one end of the resistive conducting strip, and forming a third connector path connected to the junction between the second connector path and the resistive conducting strip, and forming the edge of the resistive conducting strip which is remote from the first edge a distance approximately $Y_{off}$ from the feature line; wherein the resistance measuring means connecting step includes connecting a constant current source to pass current through the first connector path, the resistive conducting strip and the second connector path in series; and connecting a voltmeter to measure voltages $V_1$ and $V_2$ respectively between the first and third, and second and third connector paths' ends unconnected to the resistive conducting strip; and wherein the discrete machining sensor forming step further comprises forming at least a first of said sensor's sensing line having a predetermined precise spacing from the feature line; and further comprising the steps of:

(a) machining the first edge of the surface toward the ideal final position line until the continuity tester indicates that continuity of the first discrete machining sensor has ceased;

(b) recording the voltages $V_1$ and $V_2$ at the instant continuity for said first discrete machining sensor ceases;

(c) inserting the known value of the predetermined precise spacing between the first sensor's sensing line and the feature line as the variable h, an approximation for $h_2/Q$, and the corresponding values for $V_1$ and $V_2$ recorded when the first sensor's continuity ceased, into the equation three $$h=[V_2h_2/Q(V_1-xV_2)]-Y_{off}$$

to produce a linear equation in the unknown $Y_{off}$;

(d) solving the linear equation for the value $Y_{off}$ and inserting this value into the equation three; and (e) while machining continues, periodically recording the voltages $V_1$ and $V_2$ and calculating h from equation three using the values for $V_1$ and $V_2$ most recently recorded and the value for $Y_{off}$ resulting from solving the linear equation.

5. A method for controlling the machining of a first edge of a surface on a workpiece from its initial location to adjacent an ideal final position line substantially parallel to the first edge and carried on the surface, and having a predetermined precise spacing from a feature line carried on the surface and substantially parallel to the first edge, comprising the steps of:

(a) forming on the surface at least one discrete machining sensor each having a sensing line falling between the initial location of the first edge and the ideal final position line, said sensing line being substantially parallel to the first edge, and having a precisely determined spacing from the feature line;

(b) forming a parallel-edged resistive conducting strip comprising resistive material of substantially constant thickness lying along the first edge's initial location and intersected by
  (1) extensions of each of the sensing lines, and
  (2) the ideal final position line, said conducting strip having a less precise spacing from the feature line than has the sensing line of the discrete sensor;

(c) connecting a resistance measuring means across the resistive conducting strip, which means provide a signal indicative of the resistance of the conducting strip;

(d) connecting a continuity tester across each discrete sensor;

(e) machining the first edge of the surface toward the feature line until the continuity tester indicates that continuity of a discrete sensor has ceased; then without further machining (f) analyzing the signal from the resistance measuring means to determine the resistance R across the resistive conducting strip;

(g) calculating an offset constant $Y_{off}$ from an equation one of the form $h=(K/R)-Y_{off}$ by substituting
  (1) the known spacing from the feature line of the sensing line whose discrete sensor's continuity has ceased, for the distance h between the feature line and the first edge,
  (2) an approximation for the value K based on physical characteristics of the resistive conducting strip, and
  (3) the resistance indicated by the resistance measuring means for the resistance R across the resistive conducting strip,
  and solving the equation for $Y_{off}$;

(h) continuing machining of the first edge toward the ideal final position line;

(i) while machining, analyzing periodically the signal from the resistance measuring means to determine the resistance R of the resistive conducting strip, and with the previously calculated value of $Y_{off}$ and the approximation for the value of K, calculating therefrom the current value of h using equation one; and (j) ceasing machining when the value of h is reduced to within a predetermined range of the predetermined precise spacing between the ideal final position and feature lines.

* * * * *